United States Patent Office.

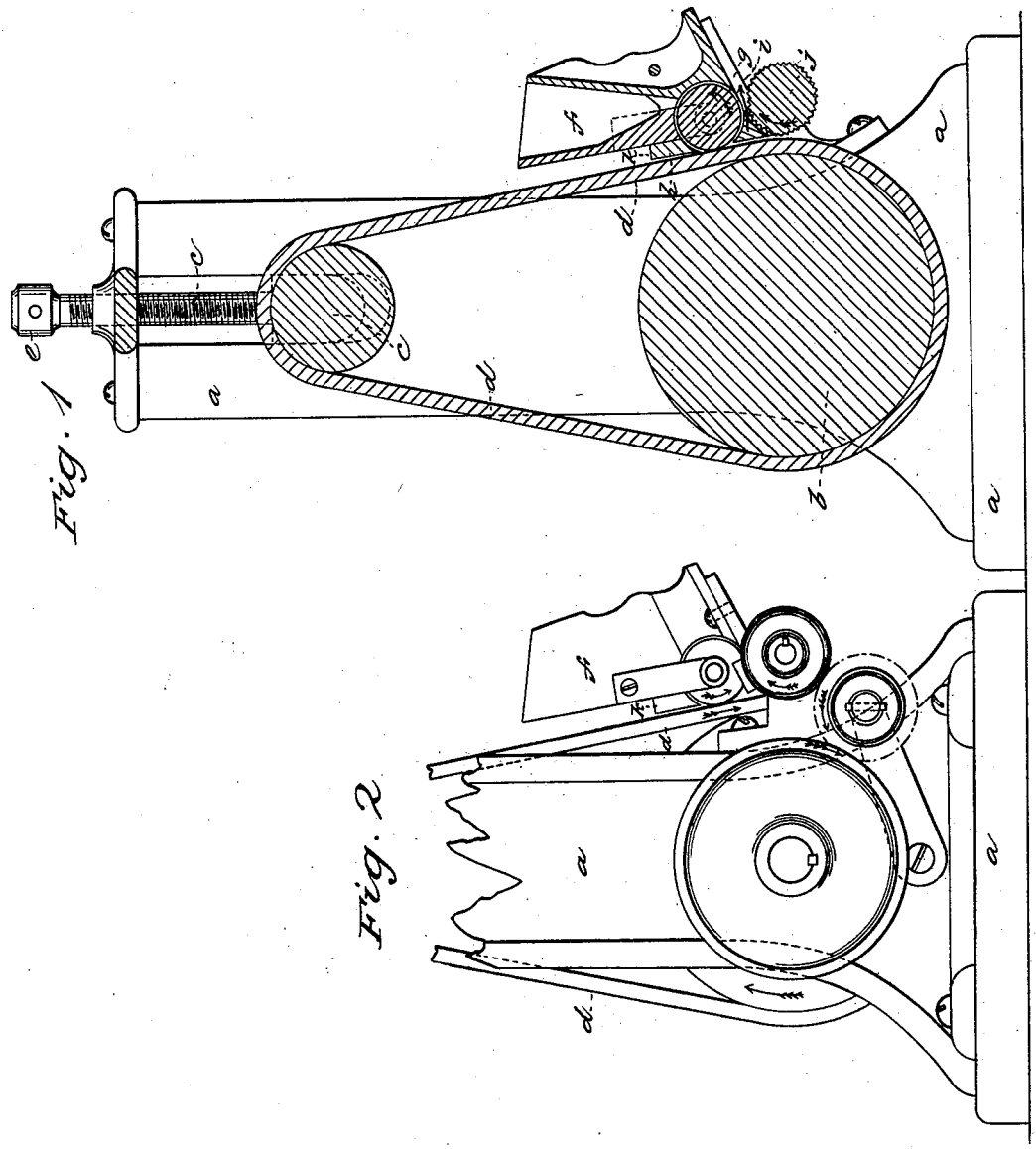

WILLIAM G. ADAMS, OF FRANKLIN, MASSACHUSETTS.

Letters Patent No. 65,037, dated May 28, 1867.

---

IMPROVEMENT IN MACHINES FOR HULLING RICE.

---

The Schedule referred to in these Letters Patent and making part of the same.

---

TO ALL WHOM IT MAY CONCERN:

Be it known that I, WILLIAM G. ADAMS, of Franklin, in the county of Norfolk, and State of Massachusetts, have invented an improved Rice-Hulling Machine; and I do hereby declare that the following, taken in connection with the drawings which accompany and form part of this specification, is a description of my invention sufficient to enable those skilled in the art to practise it.

The object of my invention is the separation of the husks of "paddy" or rough rice from the kernels therein without breaking the latter. This has been long sought, but with indifferent success, as the best machines for that purpose now known to me break a large percentage of the kernels, which detracts from their market value. By my machine, which I will now proceed to describe, I remove the husks of the paddy rapidly and effectively, and with a percentage of breakage of the kernels which is less than that produced by any other hulling machine with which I am acquainted.

Figure 1 of the drawings shows my machine in vertical section; and

Figure 2 shows in side elevation a portion thereof, merely illustrating how the motions of the different moving parts may be obtained.

In the frame $a$ two rolls or drums, $b$ and $c$, are mounted so as to rotate, the elastic yielding endless belt $d$, preferably of rubber, passing over both drums, the lower one of which, $b$, having power applied thereunto to rotate it, thus driving the belt $d$ which rotates the upper roll $c$. The bearings of the upper roll $c$ are mounted in boxes capable of vertical adjustment by screws $e$, so that proper tension of the belt $d$ may be always maintained. Secured to the frame is a hopper, $f$, for reception of paddy, the only necessary peculiarity of which is that the outlet upon the feed-roll $g$, which, like the belt $d$, is elastic and yielding, and preferably of rubber, shall be less in width than the length of the grains of paddy, said width being preferably slightly in excess of the diameter of the largest grains of paddy. The feed-roll is rotated in the direction indicated by contact with the belt, which is driven in the indicated direction, so that the grains of paddy, not being able from the size of the hopper outlet to escape therefrom with any other than substantially a sidewise presentation, are seized by the feed-roller, and are carried to the belt $d$ with their axes substantially parallel to the axis of the feed-roller, and under the concave $h$, which is concentric with $g$, but at about the distance of the diameter of a grain of paddy from the periphery of the feed-roll. Beneath the feed-roll is fixed the piece $i$, having one face parallel with the face of the adjacent portion of the belt, but located at a distance therefrom of about the diameter of a grain of paddy. The upper corner of this piece comes so nearly into contact with the feed-roll $g$ as to act as a scraper thereunto, or at least near enough to prevent the paddy from entering between the upper concave of piece $i$ and the feed-roll. Directly below said piece $i$ is located a rough-surfaced roll, $j$, which is made to rotate in the direction indicated, and so close to the face of the belt $d$ that each grain of paddy, as it passes downward, is brought into contact with the roughened surface of the roll $j$, by which the husk on each kernel is cracked and loosened. The grains of the paddy are embedded and held in the elastic yielding substance of the belt, so that they are held thereby against the action of the rough roll $j$, which, instead of removing the grains and carrying them with it in the direction of its rotation, acts, as before stated, to crack and loosen the husks on the kernels, after which action they fall from between the belt and roll into any suitable receiver. For the roll I prefer steel, with a surface formed by cutting, as in the manufacture of files, but other kinds of rough-surfaced rolls may be used. The direction of the rotation of the roll may be the reverse of that indicated, but in such case the roll should have a surface velocity less than that of the belt; but I prefer to rotate the roll in the indicated direction, and at a surface velocity rather less than that of the belt. Instead of making use of a belt as described, the drum $b$ may be covered with elastic yielding material, preferably rubber, and the hopper, the feed-roll, the piece $i$, and the rough roll properly arranged with reference to the cylindrical surface of the covered drum. The piece $k$ is adjustably attached to the hopper, so that in case of wear of the concave above the feed-roll, said adjustable piece may be moved towards the surface of said roll.

Having described the construction and operation of my machine, I will now state that my invention therein embodied consists in, and that I claim—

The combination of a narrow-outletted hopper, an elastic yielding feed-roll, with its corresponding concave, an elastic yielding conveying surface, a rough-surfaced cylinder, and a surface opposed to the yielding conveying surface, and extending between the feed-roll and the rough-surfaced roll nearly tangentially thereunto, when said parts or their equivalents are arranged so as to operate substantially as described.

WM. G. ADAMS.

Witnesses:
    J. B. CROSBY,
    F. GOULD.